Patented Feb. 19, 1935

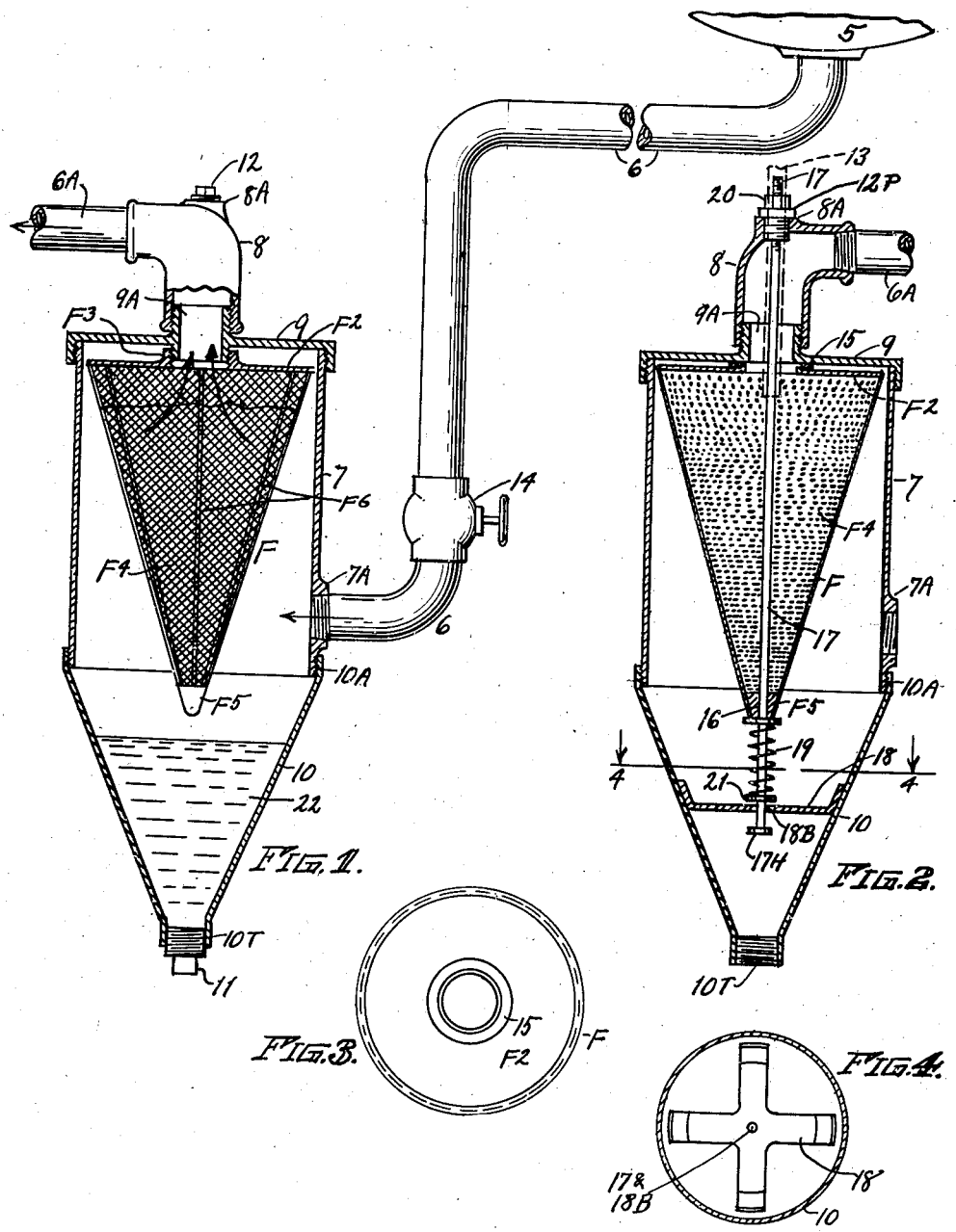

1,991,644

UNITED STATES PATENT OFFICE 1,991,644

FUEL OIL FILTER

William H. Wolters, St. Paul, Minn.

Application December 14, 1932, Serial No. 647,145

2 Claims. (Cl. 210—165)

My invention relates to fuel oil filtering devices adapted to be inserted in the oil feed line between a source of fuel supply and the burner as in a heating plant.

The main object is to provide a simple, highly efficient and inexpensive filter device having certain features of construction and use as hereinafter fully set forth and claimed reference being had to the accompanying drawing, in which,—

Fig. 1 is a side elevation of my device in a preferred form and in operative position in a fuel-oil feed line, the filter itself being shown in approximately central vertical section.

Fig. 2 is a modification of the filter shown in Fig. 1, omitting the main part of the feed line.

Fig. 3 is a top view of the filter cone shown in Fig. 2.

Fig. 4 is a transverse sectional view as on line 4—4 in Fig. 2.

Referring to the drawing by reference numerals, 5 designates a fuel-oil supply tank from which an oil conductor pipe 6—6A leads to any suitable type of oil burners (not shown) in a heating plant, 6 designating the main part of the fuel pipe leading into my filter device at 7A and 6A designating that part of the fuel pipe extending from my filter outlet 8 to the burner.

In the preferred embodiment of my filter device 7 is an upright cylindrical chamber provided with a removable top or cap 9 and 10 is a downwardly tapered or funnel-like lower closure for the chamber and which may be threaded as at 10A to be removably connected to the lower extremity of the chamber 7. Member 10 has a threaded lower extremity 10T or outlet, for a correspondingly threaded plug 11 which also represents any suitable type of drain valve.

In Figs. 1 and 2, 7A is a suitably threaded intake opening in the side of the cylindrical chamber 7 and near its lower extremity providing for direct intake of oil into the filter from pipe, and 9A designates an integral nipple central of cover 9, said nipple extending above and below the web of the said cover and threaded as best shown in Fig. 1. In Fig. 2 this nipple extends upwardly only, said upper nipple part adapted to receive the lower and larger end of a reducing L-pipe 8 the other end of which is connected to fuel pipe 6A. Member 8 therefore comprises the outlet for fuel oil.

8A is a threaded vertical outlet in member 8 and normally closed by a suitable plug 12 said plug being in vertical alinement with the drain plug 11. This is for clean-out purposes and makes it possible to insert a steam pipe 13 designated in dotted lines in Fig. 2) downwardly into the device it being understood that plug 11 must be removed, then steam admitted into the chamber. Obviously when this steam clean-out is taking place, oil feed through pipe 6 must be shut off by a valve such as 14 (Fig. 1).

An important part of my filter is a conical filter, tapered downwardly, and identified as a whole by the letter F. The upper part of this filter comprises a metal disc F2, with a central, threaded outlet F3 to be threaded on to lower part of nipple 9A. The conical part F4 is foraminated, being made either of perforated sheet metal or suitable wire screen of fine mesh. It has been found that so-called 80 mesh is suitable for filtering heavier grades of fuel oil and 100 mesh for distillate.

The point or lower end of the filter cone may be a piece of metal F5 and between this part and the disc F2 the foraminated part F4 may be suitably reenforced by wires or bars F6.

Obviously the filter cone F shown in Fig. 1 is rigidly and centrally fixed, the lower extremity of the cone being preferably, about on a common level with the lower end of shell 7 or slightly below this level.

In Figs. 2, 3 and 4 the filter cone F is of modified construction, but of same proportions as the cone F in Fig. 1. However, the disc F2 has no threaded outlet but provided with a plain upwardly flanged circular hole encircled by a packing ring 15 arranged to contact with the lower surface of cover 9 and concentric of its outlet 9A. Member F5 of the cone is bored longitudinally, as 16, for slidable insertion of a bar 17 extending therebelow through the central bore 18B of a fixed horizontal spider 18 in the lower part of shell member 10. Between said spider and member F5 of the cone, rod 17 is encircled by a compression coil spring 19 pressing the cone F upwardly and holding it rigid. In this construction rod 17 extends upwardly through the L-pipe and a packing nut 12P threaded into its outlet 8A, said upper extremity of the bar being threaded for a nut 20 contacting with the upper face of nut 12P to hold the bar 17 rigid. The lower end of spring 19 contacts a fixed washer 21 on the rod and below spider 18 the said rod may have a head 17H. It will now be readily seen that adjustment of nut 20 will regulate the compression in spring 19 and hold the cone F rigid and concentric accordingly.

The use or operation of my filter has already been partially disclosed. When oil is circulating to the burner through pipes 6, 6A whether by gravity, suction or applied force, it feeds directly into the chamber 7 at 7A, filling the chamber then being filtered through the cone while passing upwardly to the pipe 6A. Particles of foreign matter in the oil are lodged initially on the cone and oil delivered through pipe 6A is relatively pure and in desirable condition for burning. Foreign matter will settle in the chamber, settling in the tapered part 10, a quantity of such matter being shown and designated as 22 in Fig. 1 and is readily drained out at suitable intervals.

The simplicity of construction readily permitting removal or replacement of the filter cone and other parts will be readily seen.

I claim:

1. In an oil filter of the class described and adapted to be removably installed in a fuel line between the source of fuel supply and a fuel burner; said filter device comprising an upright cylindrical chamber with oil intake port in its side, a cover for said chamber provided with an oil outlet port, a conical, foraminated filter member removably mounted concentrically within said chamber intermediate said ports, said chamber formed with a lower integral and concentric section comprising a sediment chamber below the level of said intake port, means for retaining said filter rigidly within the cylindrical chamber with its tapered end downwardly, the upper end or base part of said filter comprising a transverse disc with an outlet provided at its center and adapted to be retained with said outlet concentric of the oil outlet of the chamber, means for retaining the filter comprising a rod extending concentrically and vertically through the chamber and extending slidably through the lower end of the conical filter, a spider fixed transversely in the sediment chamber below said filter, said rod insertable downwardly through said spider, a compression coil spring about said rod between the spider and the filter, said rod extending upwardly through the oil outlet and accessible exteriorly thereof, and means on said accessible part of the rod for adjusting it vertically to vary the compression in said spring and press the filter upwardly toward the cover.

2. The structure specified in claim 1, and a suitable packing ring about the outlet of the filter member and adapted to be pressed against the inner surface of the cover.

WILLIAM H. WOLTERS.